May 27, 1952 W. STEINEN 2,597,905
HANDLE CONSTRUCTION FOR MIRRORS AND TOILET SET ARTICLES
Filed Aug. 12, 1946
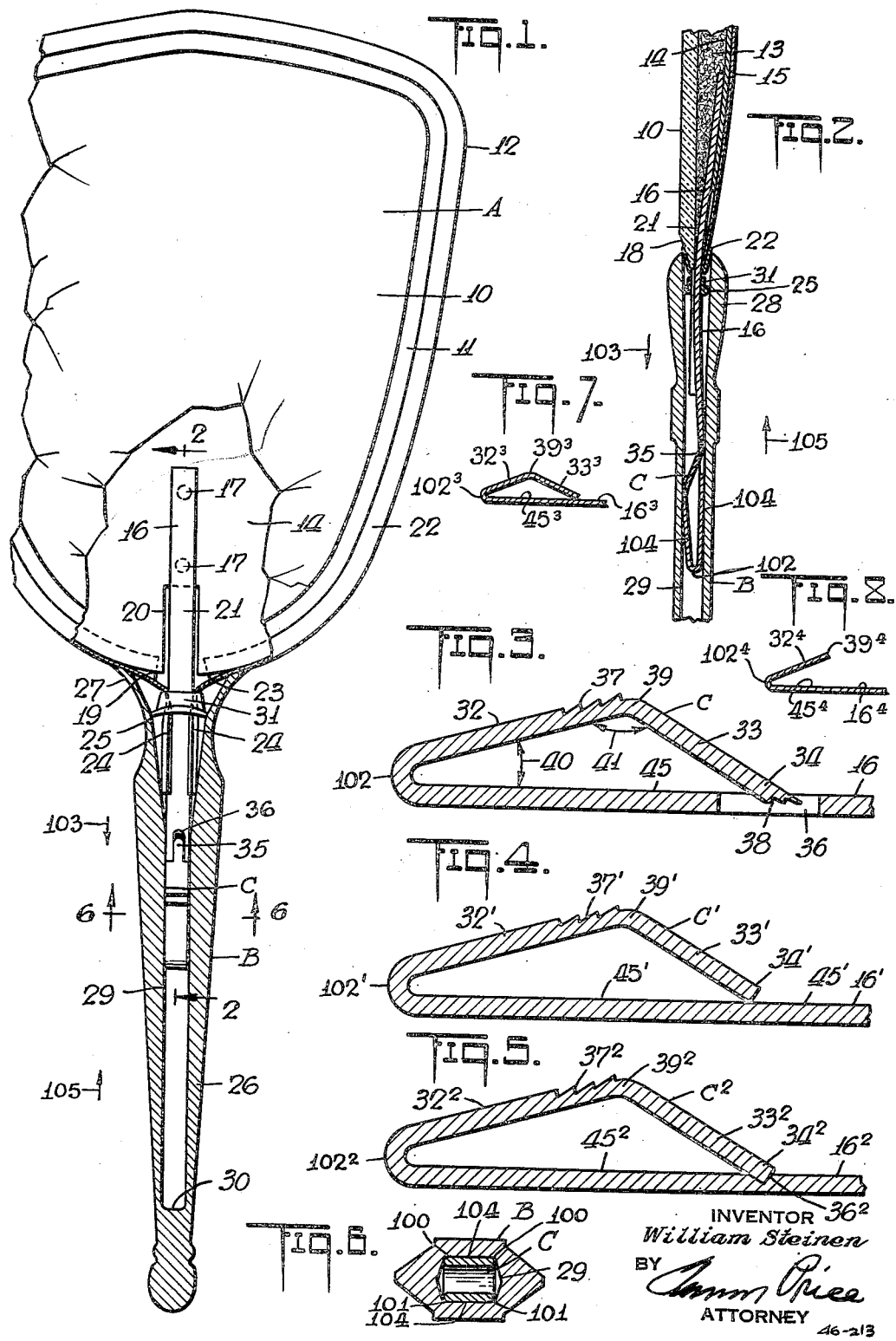
INVENTOR
William Steinen
BY
Amos Price
ATTORNEY
46-213

Patented May 27, 1952

2,597,905

UNITED STATES PATENT OFFICE 2,597,905

HANDLE CONSTRUCTION FOR MIRRORS AND TOILET SET ARTICLES

William Steinen, Newark, N. J.

Application August 12, 1946, Serial No. 690,052

1 Claim. (Cl. 88—102)

The present invention relates to a handle construction and it particularly relates to a push-in handle construction useful in implements and toilet set articles, such as hand mirrors, hand brushes, nail files and so forth.

It is among the objects of the present invention to provide a novel handle construction of the push-in type of reliable, inexpensive, durable construction, which may be readily assembled and manufactured without expensive die casting or metal stamping operations.

A further and specific object is to provide a novel mirror and handle construction in which the frame of the mirror and the handle will be unitarily, resiliently and yet rigidly assembled with assurance that the handle will not loosen or separate from the mirror and with further assurance that the mirror sub-assembly will at all times be tightly drawn up and permanently engaged by the edge channel.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

This return bent structure is preferably provided with gripping teeth to engage the interior walls of the handle recess permitting insertion of the resilient withdrawal thereof.

In the drawings which show several preferred forms of the invention by way of illustration and not by way of limitation, Fig. 1 is a front plan view of the handle construction as applied to the hand mirror of a toilet set with the side of the mirror broken away, and the handle shown in vertical side section, Fig. 2 is a transverse vertical sectional view upon the line 2—2 of Fig. 1, Fig. 3 is a fragmentary side sectional view upon an enlarged scale of the resilient toothed grip element to be inserted into the handle, Figs. 4 and 5 are views similar to Fig. 3 of alternative embodiments, and Fig. 6 is a detailed fragmentary transverse sectional view upon the line 6—6 of Fig. 1 upon an enlarged scale as compared to Fig. 1.

Figs. 7 and 8 are fragmentary sections of the spring member.

Referring to Figs. 1 and 2, the mirror A has a handle B. The mirror A includes a reflector 10 which has a bevelled edge 11 which is held by the thin sheet metal channel edge 12. The mirror has a resilient or felt backing 13 in back of which is the similarly shaped sheet metal member 14. The member 14 has the same outline as the reflector 10 and also has an ornamental backing 15 permanently applied.

On the inside face of the plate 14 is riveted or welded at 17 the bar 16 (see Figs. 1 and 2) which extends downwardly beyond the lower edges 18 of the reflector 10 and 19 and the plate 14. The plate 14 has a cut away at 20 to enhance the resiliency of the bar 16, leaving the portion 21 of the bar free to swing slightly forwardly and rearwardly.

The bar 16 terminates in the resilient push-in gripping element C shown in large scale in Fig. 3 and small scale in Figs. 1 and 2.

The side channel rim 12 as shown in Fig. 1 has its side walls 22 cut away at 23 and is provided with extensions 24, which project along the side edges of the bar 16. The extensions 24 are held in position by the collar or sleeve 31 with the curled rim 25 enabling it to be pressed into position. The extensions 24 are drawn into the collar or sleeve 31 and the rim 12 is thus held tightly on the level 18.

The handle B (see Fig. 1) may be made in various ways and for example may be die cast of zinc, antimony or lead alloys, the alloys known as Adamac #3 or C. M. Gray Alloy 2-3 being suitable. It has a body 26, a sidewardly flaring top 27, the sides 28 of which are of extra thickness for strength. The central opening 29 converges slightly downwardly toward the bottom 30 and is rectangular in cross-section closely fitting the side edges and front and back of the resilient grip element C as best shown in Fig. 6. As shown in Fig. 6 the vertical edges of the bar 16 and the grip C are rounded as indicated at 100 and 101.

As shown in Fig. 3, the resilient grip element C is formed by bending back at 102 the portion 32 of the bottom of the bar 16 to an angle 40 of 15 to 20° with the bar 16. Then the portion 32 is bent down to form the portion 33 at an angle 41 of 100° to 140°, 120° being preferred. The end 34 of the portion 32 is of reduced width as indicated at 35 in Fig. 1 and it projects through the opening or slot 36 in the middle of the bar 16.

The teeth 37 and 38 have right angle edges adjacent the upper end 27 of the handle B and 60° slant inwardly slanting edges away from the upper end 27. The teeth 37 and 38 will thus not resist push-in movement in the direction 103, but will grip the sides 104 of opening 29 in the handle, resisting pull-out movement in direction 105. The teeth 37 are cut on the hump 39 of the element C while the teeth 38 are cut in the end 34.

Although the bar 16 may be of varying materials and thicknesses, it has been found quite satisfactory in one embodiment to make it of steel 50 to 60 thousands in thickness and ¼" to 5/16" in width. The corners or edges are preferably rounded so that all gripping is done by the teeth 37 and 38. The taper of the opening 29 may be an ordinary mandrel taper of the order of 0.010 or 0.015 inch.

In Fig. 4, similarly functioning parts being indicated by the same letters and numerals primed, the edge 34' may slide upon the face 45' of the bar 16'.

In Fig. 5, similarly functioning parts being indicated by the same letters and numerals provided with a superior 2, the end $34^2$ is received in the 90° recess $36^2$ so that it is held in position.

In Fig. 7, similarly functioning parts being indicated by the same numerals provided with a superior 3, the thickness of the stock $16^3$ has been somewhat decreased and the teeth on the hump $39^3$ omitted with the resiliency of the bent portions $32^3$ and $33^3$ serving to retain the handle insert in position in the hollow handle.

In Fig. 8, similarly functioning parts being indicated by the same numerals provided with a superior 4, the section $33^3$ of Fig. 7 has been omitted leaving the end $39^4$ to serve as a gripping or retainer edge like the teeth 37, 37' or $37^2$ to resist withdrawal of the handle insert.

In assembly the reflector 10, felt 13 and back 14 are assembled with the run 12 which is drawn up by the collar 31. Then the gripping element C, C' or $C^2$ is forced into the opening 29. This will compress the bow 39, 39' or $39^2$ toward the face 45, 45' or $45^2$. The teeth 37, 37' $37^2$ and also the teeth 38 in Fig. 3 will grip the walls 104 of the recess 29 holding the bars 16, 16' and $16^2$ in position as shown in Fig. 1.

Instead of a mirror the handle B may be used with brushes, nail files, button hooks, shoe horns and similar elements.

It is thus apparent that an effective push-in handle is provided which is independent of the article to which the handle is applied and which will give a permanent lock between the utensil extension and the handle with threaded nuts, bolts or other take-up devices.

As many changes could be made in the above handle construction and many apparently widely different embodiments of this invention could be made without departing from the scope of the claim, it is intended that all matter contained in the above description or shown in the accompanying drawings shall be interpreted as illustrative and not in a limiting sense.

What is claimed is:

A push-in handle construction for hand mirrors, hand brushes, nail files and other toilet set implements, comprising a hollow handle and a handle insert jammed therein having two strips of metal, one flat strip and one bowed strip, said bowed strip integrally bent backwardly from said flat strip first outwardly and then inwardly to abut said flat strip, compressed toward the flat strip when jammed in said handle, said flat strip having a recess and one end of said bowed strip extending through said recess and contacting the interior surface of the hollow handle.

WILLIAM STEINEN.

REFERENCES CITED

The following references are of record in the file of this patent:

UNITED STATES PATENTS

| Number | Name | Date |
| --- | --- | --- |
| 411,045 | Miller | Sept. 17, 1899 |
| 1,929,590 | Krentler | Oct. 10, 1933 |
| 2,075,409 | Storch | Mar. 30, 1937 |
| 2,077,604 | Wiley | Apr. 20, 1937 |
| 2,079,988 | Cushman | May 11, 1937 |
| 2,136,644 | Steinen | Nov. 15, 1938 |
| 2,165,683 | Storch | July 11, 1939 |
| 2,220,346 | Mueller | Nov. 5, 1940 |
| 2,223,622 | Kost | Dec. 3, 1940 |
| 2,295,444 | Woodward | Sept. 8, 1942 |
| 2,345,004 | Place | Mar. 28, 1944 |
| 2,407,427 | Jones | Sept. 10, 1946 |